(12) United States Patent
Gupta et al.

(10) Patent No.: US 8,460,779 B2
(45) Date of Patent: Jun. 11, 2013

(54) MICROSTRUCTURES FOR REDUCING NOISE OF A FLUID DYNAMIC STRUCTURE

(75) Inventors: Anurag Gupta, Clifton Park, NY (US); Scott Michael Miller, Clifton Park, NY (US); Thierry Maeder, Munich (DE)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/075,795

(22) Filed: Mar. 30, 2011

(65) Prior Publication Data

US 2011/0262705 A1   Oct. 27, 2011

(51) Int. Cl.
 *B32B 3/00* (2006.01)
 *B32B 3/28* (2006.01)
 *B32B 3/30* (2006.01)

(52) U.S. Cl.
 USPC ............... 428/156; 428/167; 428/188

(58) Field of Classification Search
 USPC ............... 428/156, 167, 188; 244/130, 199.1, 244/199.2, 199.3, 199.4, 200
 See application file for complete search history.

(56) References Cited

U.S. PATENT DOCUMENTS

| 4,650,138 A | * | 3/1987 | Grose ............... 244/130 |
| 4,749,150 A | | 6/1988 | Rose et al. |
| 5,386,955 A | | 2/1995 | Savill |
| 5,533,865 A | | 7/1996 | Dassen et al. |
| 5,542,630 A | * | 8/1996 | Savill ............... 244/200 |
| 5,595,205 A | | 1/1997 | Sirovich et al. |
| 6,244,817 B1 | | 6/2001 | Ngo |
| 6,543,719 B1 | | 4/2003 | Hassan et al. |
| 6,729,846 B1 | | 5/2004 | Wobben |
| 6,948,906 B2 | | 9/2005 | Leishman et al. |
| 7,041,363 B2 | * | 5/2006 | Krohmer et al. ............ 428/209 |
| 7,108,485 B2 | | 9/2006 | Wobben |
| 2004/0197194 A1 | | 10/2004 | Leishman et al. |

FOREIGN PATENT DOCUMENTS

| DE | 3316394 A1 | 11/1984 |
| WO | 2007/055813 A2 | 5/2007 |

OTHER PUBLICATIONS

M. Picciotto et al., "Turbulence Modulation by Micro-Particles in Boundary Layers," Proceedings of teh IUTAM Symposium on Computational Multiphase Flow, pp. 53-62 (2006).

Naterer et al., "Surface micro-grooves for near-wall exergy and flow control: application to aircraft intake de-icing," Journal of Micromechanics and Microengineering, vol. 15, pp. 501-513, (2005).

\* cited by examiner

*Primary Examiner* — Catherine A Simone
(74) *Attorney, Agent, or Firm* — Ann M. Agosti

(57) ABSTRACT

A fluid dynamic structure includes a surface and a microstructure mounted on the surface. The microstructure is defined by a plurality of peaks and valleys (i.e., riblets) and includes a transition region in which each peak and valley changes from a first profile to a second profile along a chord length of the structure. The peaks and/or valleys may have a variable dimension along the length of the microstructure. The peaks and valleys can be non-linear along the chord length and have a smooth transition from the first profile to the second profile. The different profiles of the microstructure are optimized to reduce noise generated by turbulent fluid flow across the structure.

16 Claims, 9 Drawing Sheets

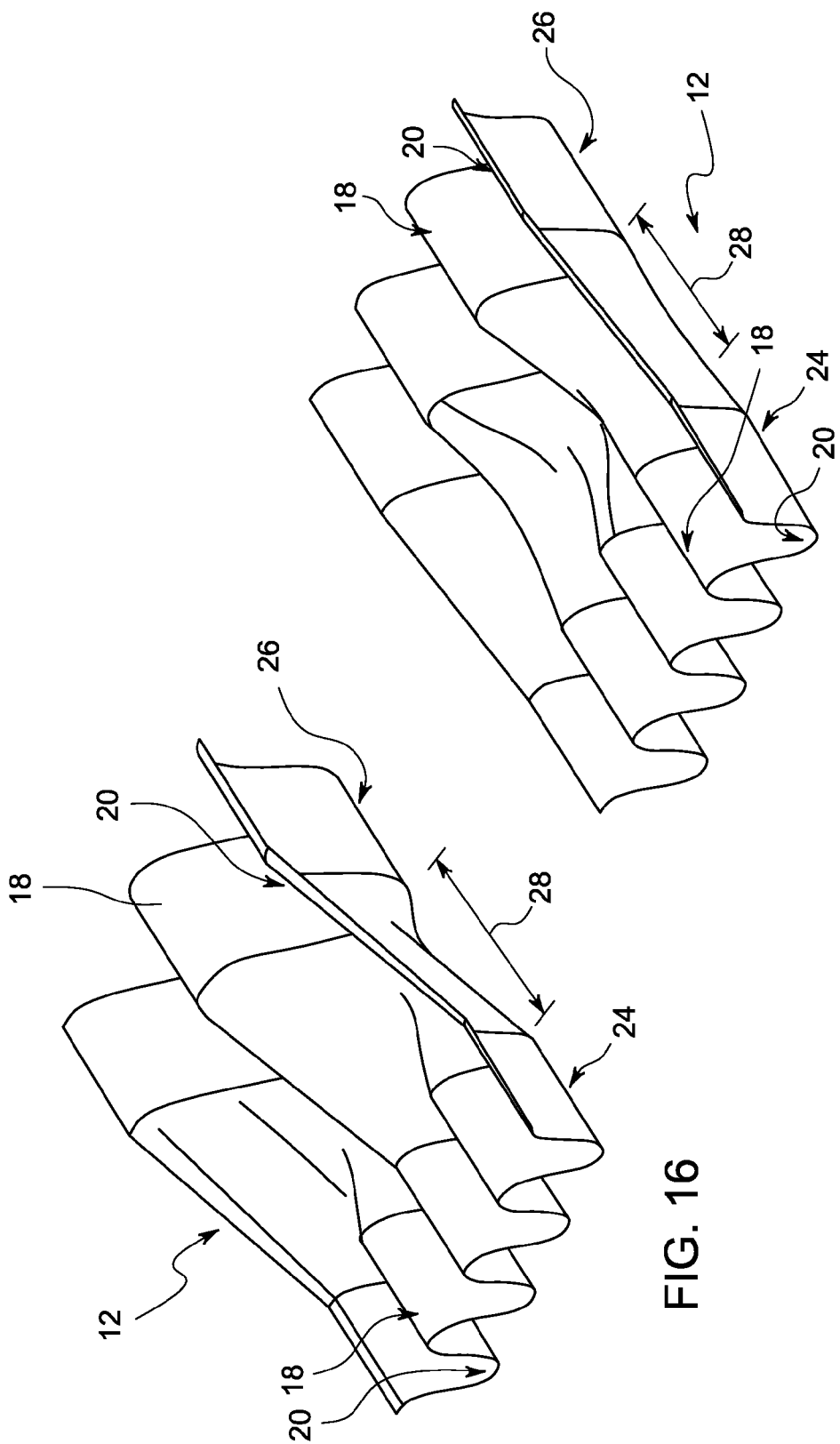

MICROSTRUCTURES FOR REDUCING NOISE OF A FLUID DYNAMIC STRUCTURE

BACKGROUND OF THE INVENTION

In fluid dynamics, turbulence or turbulent flow is a fluid regime characterized by chaotic, stochastic property changes. This includes low momentum diffusion, high momentum convection, and rapid variation of pressure and velocity in space and time.

Turbulence causes the formation of eddies of many different length scales. Most of the kinetic energy of the turbulent motion is contained in the large-scale structures. The energy "cascades" from these large scale structures to smaller scale structures by an inertial and essentially inviscid mechanism. This process continues creating smaller and smaller structures that produces a hierarchy of eddies. Eventually this process creates structures that are small enough that molecular diffusion becomes important and viscous dissipation of energy finally takes place. The scale at which this happens is the Kolmogorov length scale.

The interaction of the energetic eddies with the walls of a fluid dynamic structure creates broadband noise. For example, eddies from the turbulent boundary layer flow scatter are a significant source of noise when traveling past the trailing edge of airfoils. When a lifting airfoil moves through a turbulent stream, an unsteady pressure field develops around the airfoil, which produces acoustic waves that manifest into broadband noise. Such phenomena can readily be identified in nearly all types of vehicles, for example, automobiles, planes, helicopters, ships, submarines, and the like, the results of which can be quite troublesome. For example, helicopter noise levels can easily approach 100 dB with a large portion of this noise related to the rotor blades cutting through the wake of the leading blade. Sophisticated submarine propulsors, which are similar in form to an axial compressor in a turbofan engine, can produce considerable noise as the propulsor blades slice through boundary layer produced turbulence. In combat scenarios, such noise levels obviously hamper the stealth capability of these vehicles. In addition, with the passage of Bills, such as the "Silent Skies Act of 1999", industry is increasingly coming under pressure to reduce the levels of noise pollution associated with turbomachinery propulsors (i.e. turbofans, turbojets, etc) on their aircraft. Similarly wind turbine noise limits their public acceptance as well as the growth of the rotor to extract more renewable energy from the earth's wind resources; boundary layer noise, i.e, the interaction of turbulence in the boundary layers of the wind turbine blades with the airfoil surface, is one of the primary sources of wind turbine noise. Thus, there is a wide-spread need to reduce noise produced by the interaction of eddies with the fluid dynamic structure.

BRIEF SUMMARY OF THE INVENTION

The inventors have solved the problem of reducing noise of a fluid dynamic structure by the use of a microstructure on a surface of a fluid dynamic structure. It has been discovered that the microstructures alter the scales of turbulent eddies in such a way so as to reduce the resultant noise spectra.

In one aspect of the invention, a fluid dynamic structure comprises a surface and a microstructure defined by a plurality of peaks and valleys on at least a portion of the surface. The microstructure includes a transition region in which each peak and valley changes from a first profile defined by a first spacing and a first height to a second profile defined by a second spacing and a second height at a predetermined distance along a chord length of the fluid dynamic structure, the second profile being different than the first profile, wherein the microstructure reduces noise generated by turbulent airflow across the fluid dynamic structure.

In another aspect of the invention, a fluid dynamic structure comprises a surface and a microstructure defined by a plurality of riblets on at least a portion of the surface. The plurality of riblets include a first profile in which each riblet has a first width and a first height at a first location along a chord length of said fluid dynamic structure, and a second profile in which each riblet has a second width and a second height at a second location along the chord length of the dynamic fluid structure, wherein the second profile is different than the first profile, and wherein the second location is different than the first location, and wherein the microstructure reduces noise generated by turbulent airflow across the fluid dynamic structure.

BRIEF DESCRIPTION OF THE DRAWINGS

FIGS. 16 and 17 are schematic perspective views of the microstructure with riblets that exhibit a smooth transition between the first region with the first profile and the second region with the second profile according to an embodiment of the invention.

DETAILED DESCRIPTION OF THE INVENTION

Figure 1:
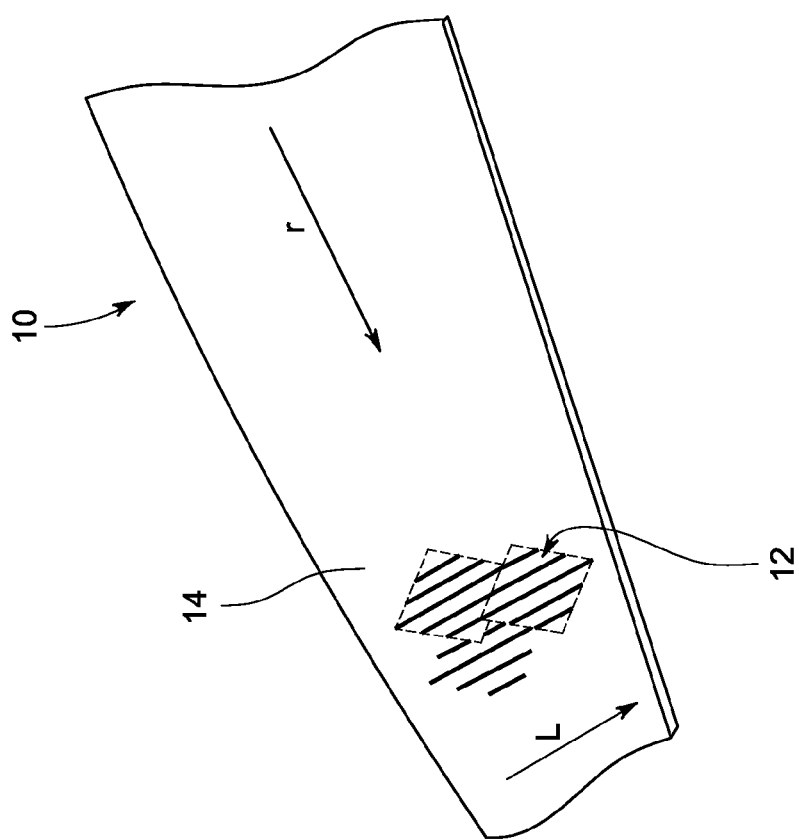
FIG. 1 is a top view of a fluid dynamic structure with a microstructure for reducing noise on the surface of the structure according to an embodiment of the invention.

Referring now to FIG. 1, a fluid dynamic structure 10 includes a microstructure 12 mounted on a surface 14 of the structure 10 for reducing noise according to an embodiment of the invention.

In the illustrated embodiment, the fluid dynamic structure 10 comprises an airfoil. However, it will be appreciated that the fluid dynamic structure can be any structure designed for aerodynamics, such as a wind turbine blade, the internal and external surfaces of an aircraft engine, a wing of an aircraft, and the like. As used herein, a "microstructure" is a structure with a two-dimensional or three-dimensional profile in either a randomized or organized pattern, with each structure having a size of about 0.1 mm or less.

Figure 2:
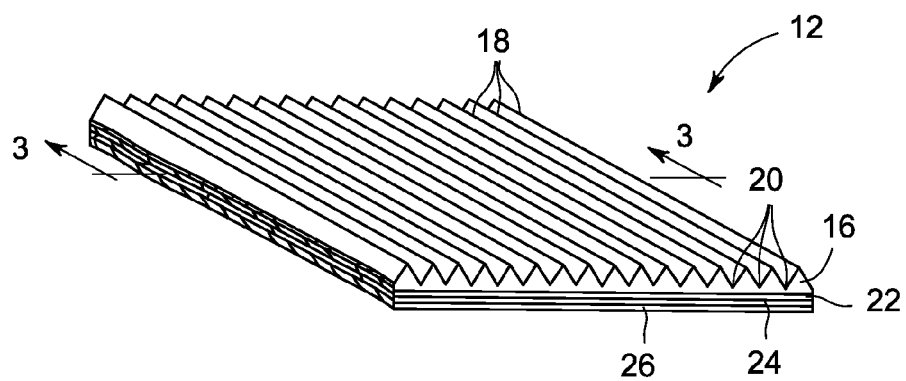
FIG. 2 is a fragmentary perspective view of the microstructure of FIG. 1.
Figure 3:
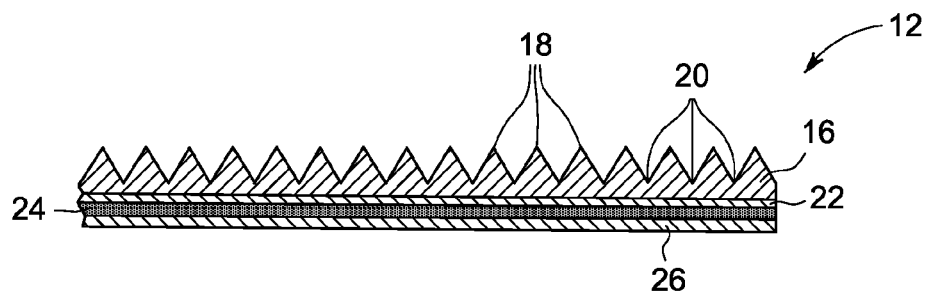
FIG. 3 is a cross-sectional view of the microstructure taken along line 3-3 of FIG. 2.

As shown in FIGS. 2 and 3, the microstructure 12 is in the form of small-size surface projections (so-called "riblets") in which an array of small longitudinal ribs (peaks 18 and valleys 20) extending over the turbulent boundary layer region of the surface 14 in the direction of fluid flow over the surface 14.

The foil or sheet containing the riblets can be opaque, translucent, or transparent. In one embodiment, the foil or sheet comprises an outer patterned backing layer 16 with an outer patterned surface having peaks 18 and valleys 20, an optional intermediate layer 22, an adhesive bonding layer 24, and an optional temporary, removable, protective liner 26, such as that described in U.S. Pat. No. 7,070,850, the contents of which are incorporated herein by reference. In another embodiment, the microstructure 12 does not include the reinforcing layer and comprises a backing layer 16 with an outer exposed patterned surface, an adhesive bonding layer 24, and an optional temporary, removable protective liner 26, such as that described in U.S. Pat. No. 5,848,769, the contents of which are incorporated herein by reference. In yet another embodiment, the microstructure 12 comprises an outer patterned backing layer 16 having an outer exposed patterned surface, an adhesive bonding layer 24, an intermediate layer 22 between the backing and bonding layers, and an optional, temporary, removable protective liner 26.

Referring back to FIG. 1, the foil or sheet can be in the form of diamond-shaped panels mounted on the surface 14 of the structure 10 in mutually displaced relationship with each other. As shown in FIG. 1, one panel or "scale" may contain a total of five riblets (peaks 18 and valleys 20), which are oriented with their longitudinal direction perpendicular (or parallel) to the radius, r, of the fluid dynamic structure 10. In other words, the riblets (peaks 18 and valleys 20) can be oriented with their longitudinal direction parallel to the chord length, l, of the fluid dynamic structure 10 and the direction of airflow over the fluid dynamic structure 10.

Figure 4:
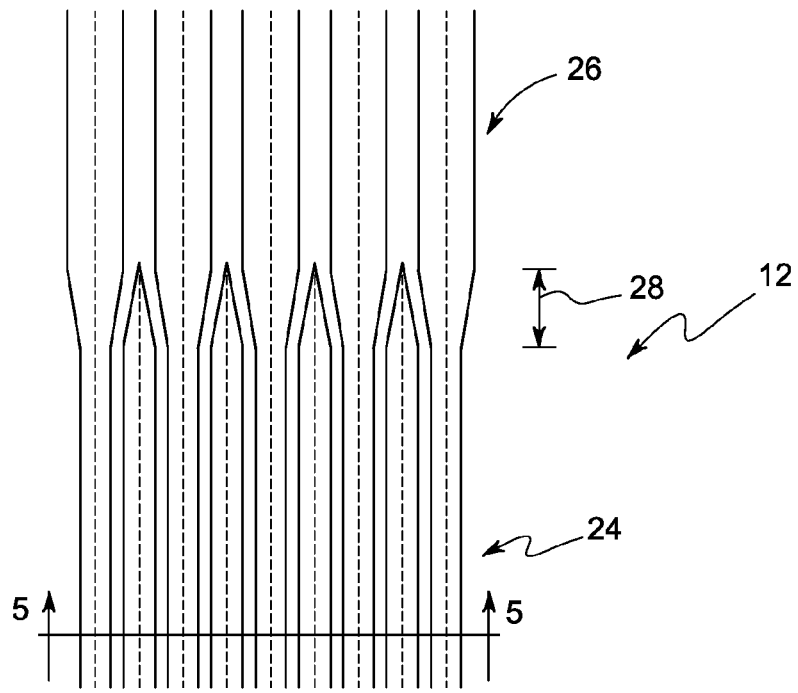
FIG. 4 is a top view of the microstructure including riblets having a first profile in a first region, a second profile in a second region, and a transition region therebetween according to an embodiment of the invention.
Figure 5:
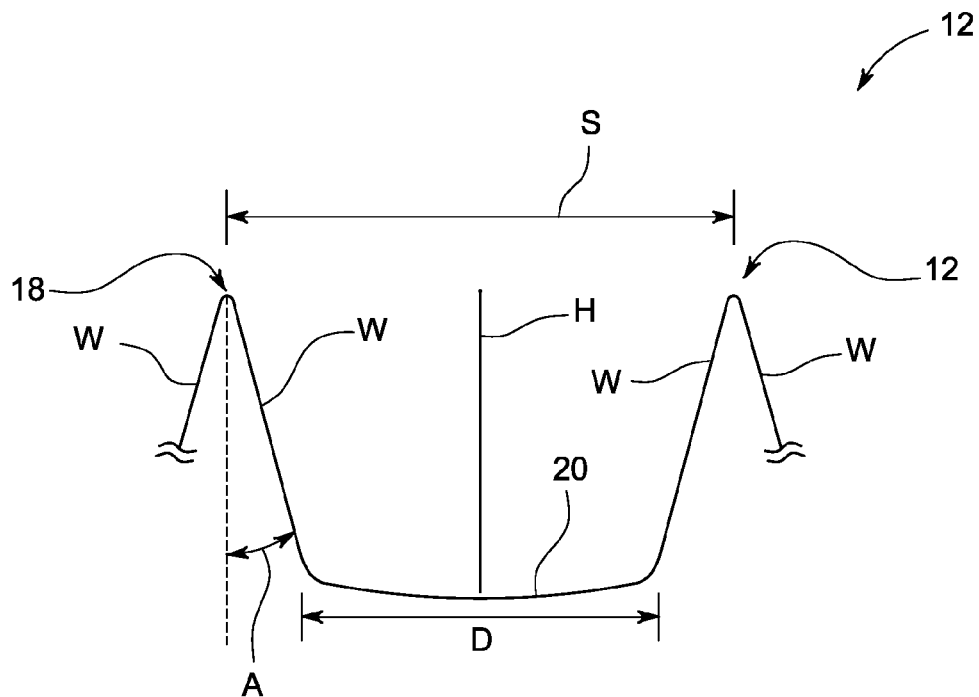
FIG. 5 is an enlarged cross-sectional view of the microstructure taken along line 5-5 of FIG. 4.

As shown in FIGS. 4 and 5, the peaks 18 of the microstructure 12 have a wedged-shaped configuration with side walls, W, defining a taper angle, A, between about 5 degrees and about 60 degrees, a height, H, and are spaced from one another by a channel spacing, S. The valleys 20 of the microstructure 12 have a distance, D. In one embodiment, the peaks 18 have a height, H, in a range between about 30% and about 70% of the channel spacing, S.

One aspect of the invention is that the microstructure 12 includes a first region 24 in which the peaks 18 and valleys 20 of the microstructure 12 have a first or initial profile (i.e., channel spacing, S, height, H, and distance, D), a second region 26 in which the peaks 18 and valleys 20 of the microstructure 12 have a second or final profile, and a transition region 28 therebetween. The peaks 18 and valleys 20 of the microstructure 12 change from the first profile to the second profile in the transition region 28 at a predetermined distance along the chord length, l, of the fluid dynamic structure 10. Of course, the invention can be practiced with more than two profiles. For example, the microstructure 12 can have three, four, five or more profiles along the chord length, l.

In one embodiment, the second or final profile is approximately twice the dimensions of the first or initial profile. For example, the peaks 18 and valleys 20 of the first or initial profile may have a channel spacing, S, a height, H, and distance, D, and the peaks 18 and valleys 20 of the second or final profile may have a channel spacing, 2*S, a height, 2*H, and distance, 2*D. Thus, the taper angle, A, is smaller in the first or initial profile as compared to the second or final profile.

It will be appreciated that the invention is not limited by the second or final profile having relative dimensions of twice that of the first or initial profile. The invention can be practiced with any relative dimensions between the first profile and the second profile, such that the relative dimension factor is a rational number greater than 1. In addition, it will be appreciated that the invention can be practiced with more than two profiles, and that the invention can be practiced with 3, 4, 5, . . . , profiles at appropriate locations along the chord length, l, of the structure 10.

Figure 6:
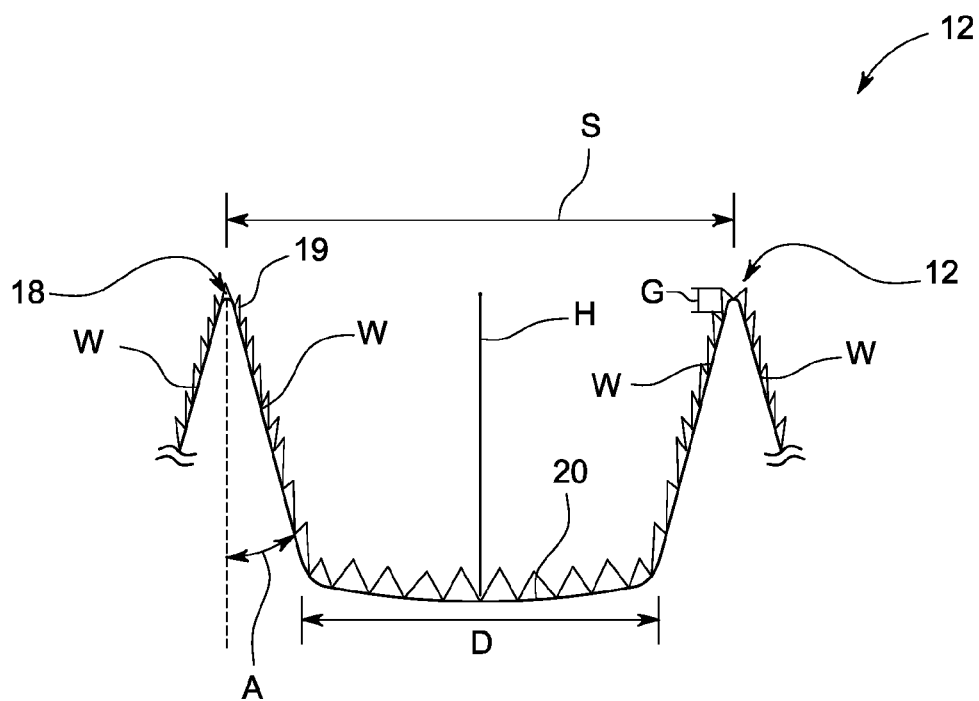
FIG. 6 is an enlarged cross-sectional view of the microstructure with micro-scale surface textures taken along line 5-5 of FIG. 4 according to an embodiment of the invention.
Figure 7:
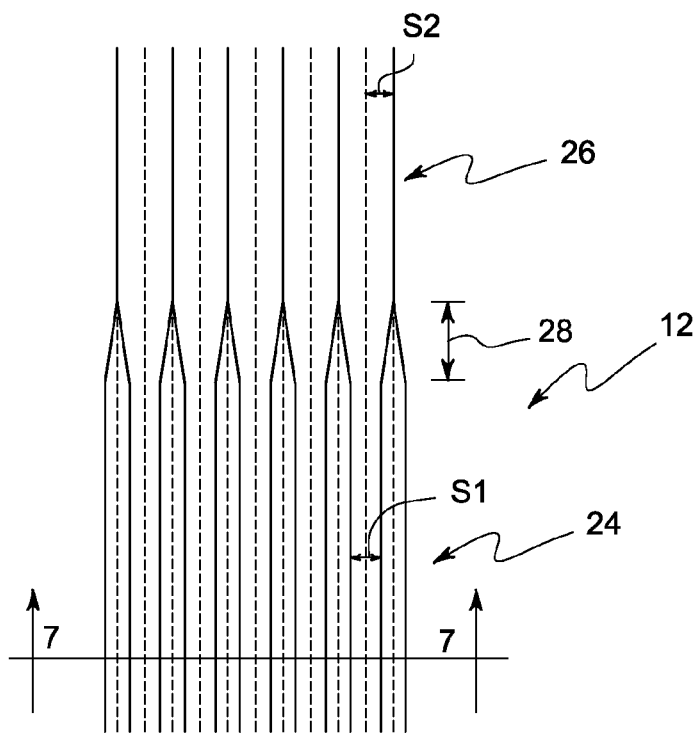
FIG. 7 is a top view of the microstructure including riblets having a first profile in a first region, a second profile in a second region, and a transition region therebetween according to another embodiment of the invention.
Figure 8:
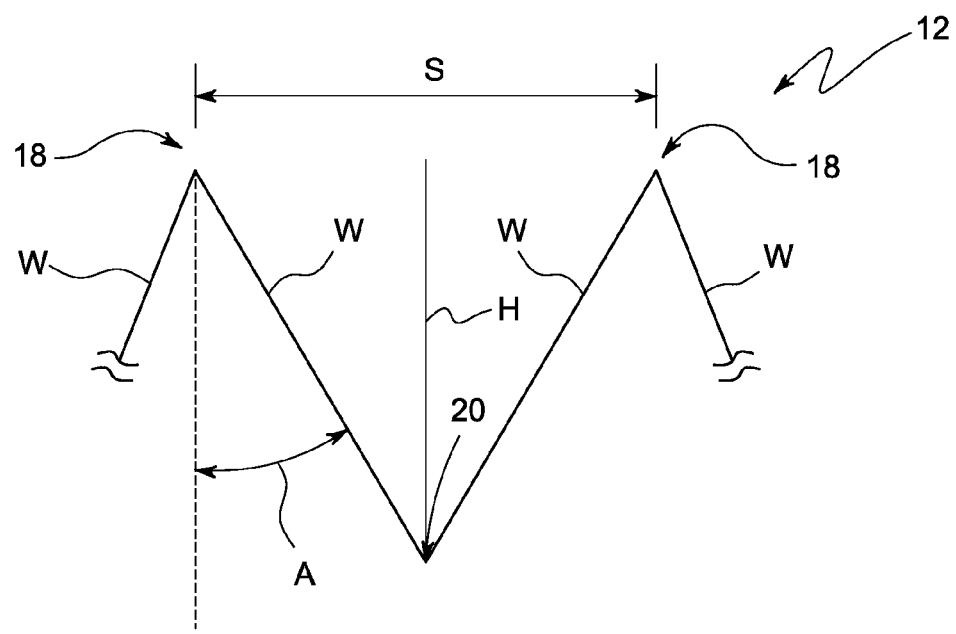
FIG. 8 is an enlarged cross-sectional view of the microstructure taken along line 7-7 of FIG. 7.
Figure 9:
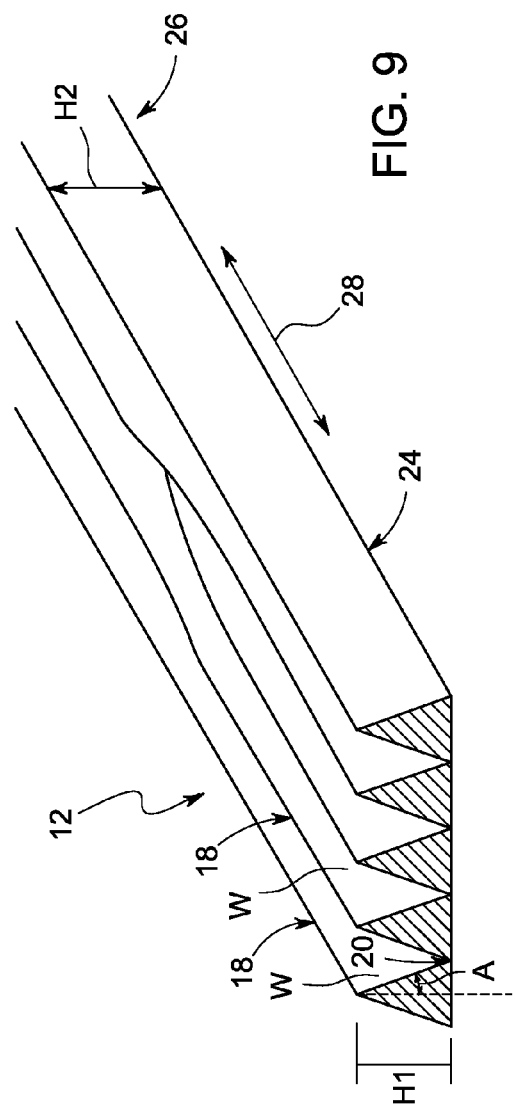
FIGS. 9 and 10 are schematic perspective views of the microstructure including riblets with peaks having a variable height according to another embodiment of the invention.
Figure 10:
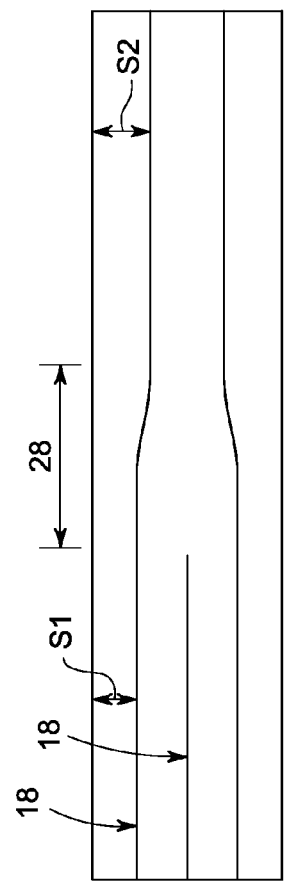

In another embodiment shown in FIG. 6, the peaks 18 and/or valleys 20 of the microstructure 12 includes one or more micro-scale surface textures 19 having a height, G, that is much smaller than the height, H, of the peaks 18 and valleys 20. The micro-scale surface textures 19 can be any desirable profile shape, such as pyramid, round, rectangular, polygonal, and the like. The purpose of the micro-scale surface textures 19 is to make the surface of the microstructure 12 superhydrophobic. It must be noted that at the conditions envisaged for these applications (e.g, wind turbine blades and aircraft engines), the wind speeds will range from the high tens (60 to 80 m/s) to the hundreds of meters per second. In such conditions, the scale of these surface textures that are required to ensure super-hydrophobicity are much smaller than the scales of the micro-structures or riblets that are designed for noise reduction. As an example, in the manifestations reduced to practice for wind turbine blades, the micro-structures for an airfoil of chord length of about 1 meter were greater than about 100 microns, whereas the scales of the required surface textures are on the order of about 100 nanometers, as described in "*Nonwetting of impinging droplets on textured surface*" by Tao Deng et al. (Applied Physics Letter 94, 133109 (2009)).

It should be realized that the distance, D, of the valley 20 of the microstructure 12 can be eliminated (D equal to zero), as shown in FIGS. 7-10. As understood, the taper angle, A, will be larger for the microstructure 12 in which the distance, D, of the valley 20 is zero as compared to the microstructure 12 shown in FIGS. 4-6 with the same channel spacing, S, and height, H.

The height and spacing of riblet peaks depend on the wall variables in the inner wall region of the turbulent boundary layer. The non-dimensional spacing (s+) and height (h+) can be defined as $$s^+ = \frac{su^*}{v} = \frac{s}{v}\sqrt{\frac{\tau_w}{\rho}}$$

$$h^+ = \frac{hu^*}{v} = \frac{h}{v}\sqrt{\frac{\tau_w}{\rho}}$$

where u* is the friction-velocity, v is the kinematic viscosity, $\tau_w$ is the wall shear stress, and ρ is the density. Walsh (1990) (Walsh, M. J. 1990: Riblets. *Viscous Flow Drag Reduction, Progress in Astronautics and Aeronautics*, Vol. 123, D. M. Bushnell and J. Hefner, eds., AIAA, pp. 203-261) has shown that for maximum drag reduction, s+ lies between 10 and 15, and that drag reduction is not very sensitive to the h/s ratio, as long as it lies between 0.5 and 2. Designing for noise reduction follows similar principles on s+ and h+, and careful control of the h/s ratio commensurate with the principle of optimizing the 3 variables to the requirements of the varying local boundary layer characteristics. The customization to the evolving boundary layer with tailored and varying spacings, heights and ratio along the flow direction is a key advantage enabled by the present invention; in the reduction to practice steps, this has enabled significantly larger noise reductions than the conventional riblets with constant height and spacing that have been used and reported earlier (e.g., U.S. Pat. Nos. 7,108,485, 7,070,850 and 6,729,846). The improvements seen in wind tunnel experiments show that the present invention provides an increased noise reduction in a frequency range between about 0 Hz to about 5000 Hz, as compared to conventional riblets with a constant height and spacing.

Figure 11:
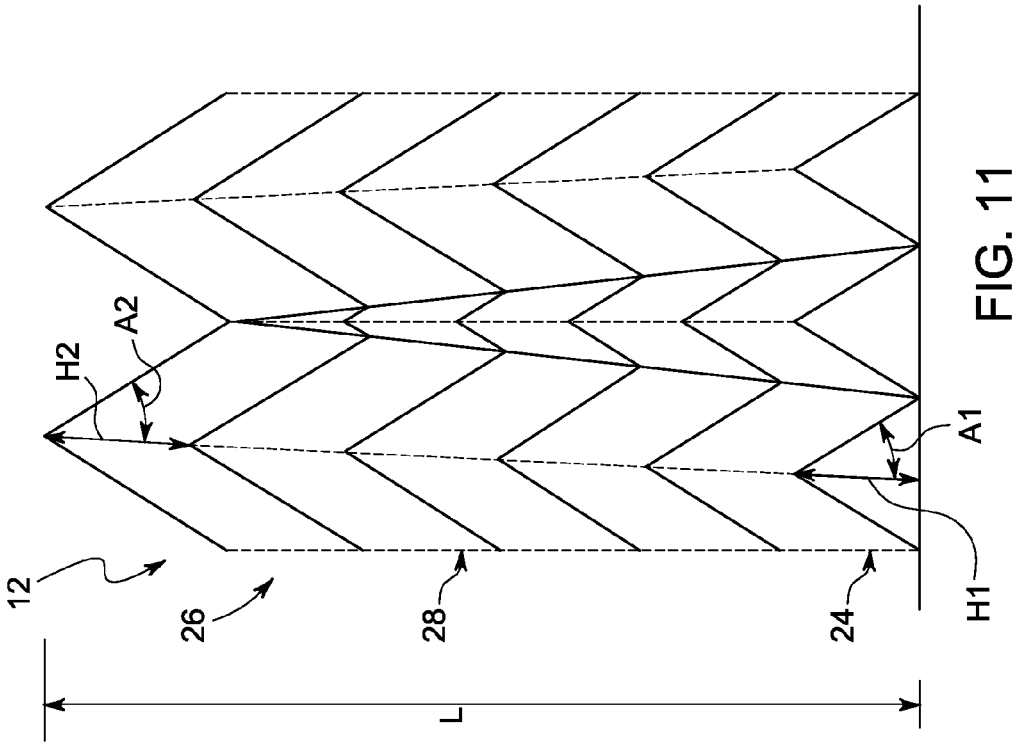

In another embodiment, the peaks 18 can have a variable height, H, along the entire length, L, of the microstructure 12, as shown in FIG. 11. In other words, the microstructure 12 shown in FIG. 11 is qualitatively similar to the embodiment shown in FIG. 7, except the transition region 28 extends the entire length, L, of the microstructure 12 in FIG. 11, whereas the transition region 28 does not extend the entire length, L, in FIG. 7. Also note that in FIG. 11, the relative dimensions increase by a factor of 1.5 over the transition, whereas in FIG. 7, the relative dimensions increase by a factor of 2. Thus, the microstructure 12 in FIG. 11 includes a first region 24 in which the peaks 18 and valleys 20 of the microstructure 12 have a first or initial profile (i.e., channel spacing, S, height, H, and distance, D), a second region 26 in which the peaks 18 and valleys 20 of the microstructure 12 have a second or final profile, and a transition region 28 extending the entire length, L, of the microstructure 12 in which the peaks 18 and valleys 20 of the microstructure 12 are constantly changing from the first profile to the second profile along the chord length, l, of the fluid dynamic structure 10.

In the illustrated embodiment, the second or final profile is approximately 1.5 times the dimensions of the first or initial profile. For example, the peaks 18 and valleys 20 of the first or initial profile may have a channel spacing, S, and a height, H, and the peaks 18 and valleys 20 of the second or final profile may have a channel spacing, 1.5*S, and a height, 1.5*H. It will be appreciated that the invention is not limited by the second or final profile having relative dimensions of 1.5 times that of the first or initial profile, and that the invention can be practiced with any relative dimensions between the first profile and the second profile. For example, the invention can be practiced with a relative dimension factor that is a rational number greater than 1, such as 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, and the like. In addition, it will be appreciated that the invention can be practiced with more than two profiles, and that the invention can be practiced with 3, 4, 5, . . . , profiles at appropriate locations along the chord length, l, of the structure 10.

Figure 12:
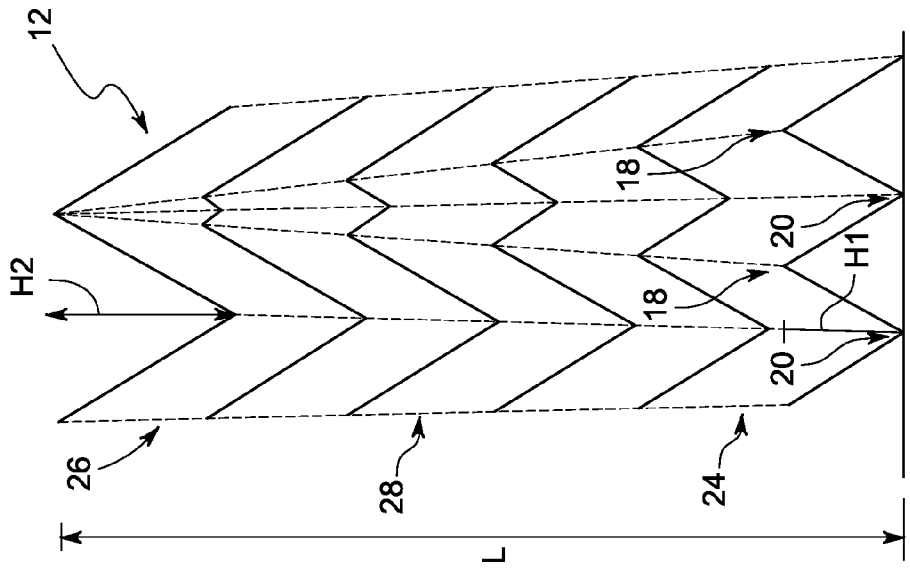
FIGS. 11 and 12 are schematic top views of the microstructure including riblets having a first profile in a first region, a second profile in a second region, and a transition region therebetween similar to the microstructure in FIG. 7, except that the transition region extends the entire length of the microstructure.

Similarly, the valleys 20 can have a variable height, H, along the entire length, L, of the microstructure 12, as shown in FIG. 12. In other words, the microstructure 12 shown in FIG. 12 is qualitatively similar to the embodiment shown in FIG. 7, except the transition region 28 extends the entire length, L, of the microstructure 12 in FIG. 12, whereas the transition region 28 does not extend the entire length, L, in FIG. 7. Thus, the microstructure 12 includes a first region 24 in which the peaks 18 and valleys 20 of the microstructure 12 have a first or initial profile (i.e., channel spacing, S, height, H, and distance, D), a second region 26 in which the peaks 18 and valleys 20 of the microstructure 12 have a second or final profile, and a transition region 28 extending the entire length, L, of the microstructure 12 in which the peaks 18 and valleys 20 of the microstructure 12 are constantly changing from the first profile to the second profile along the chord length, l, of the fluid dynamic structure 10.

In the illustrated embodiment, the second or final profile is approximately 1.5 times the dimensions of the first or initial profile. For example, the peaks 18 and valleys 20 of the first or initial profile may have a channel spacing, S, and a height, H, and the peaks 18 and valleys 20 of the second or final profile may have a channel spacing, 1.5*S, and a height, 1.5*H. It will be appreciated that the invention is not limited by the second or final profile having relative dimensions of 1.5 times that of the first or initial profile, and that the invention can be practiced with any relative dimensions between the first profile and the second profile, such that the relative dimension factor is a rational number greater than 1. In addition, it will be appreciated that the invention can be practiced with more than two profiles, and that the invention can be practiced with 3, 4, 5, . . . , profiles at appropriate locations along the chord length, l, of the structure 10.

Figure 13:
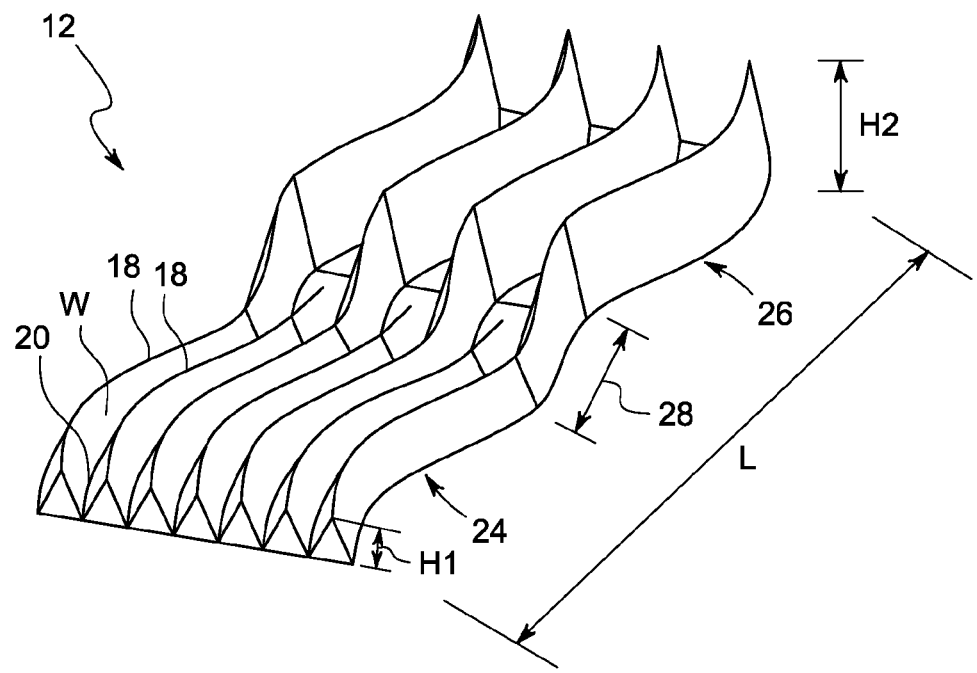
FIGS. 13-15 are schematic perspective and top views of the microstructure with non-linear riblets according to another embodiment of the invention.
Figure 14:
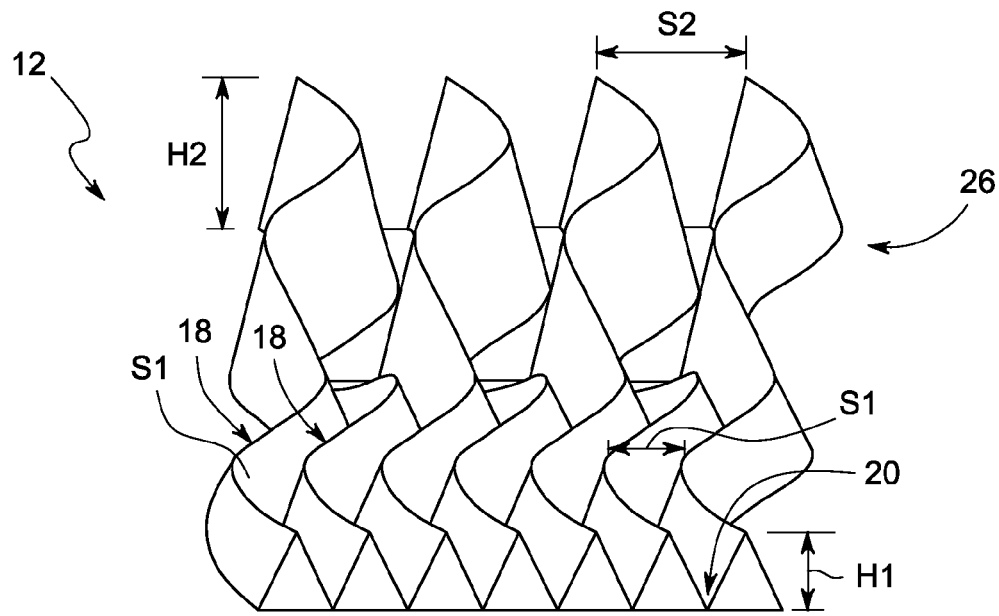
Figure 15:
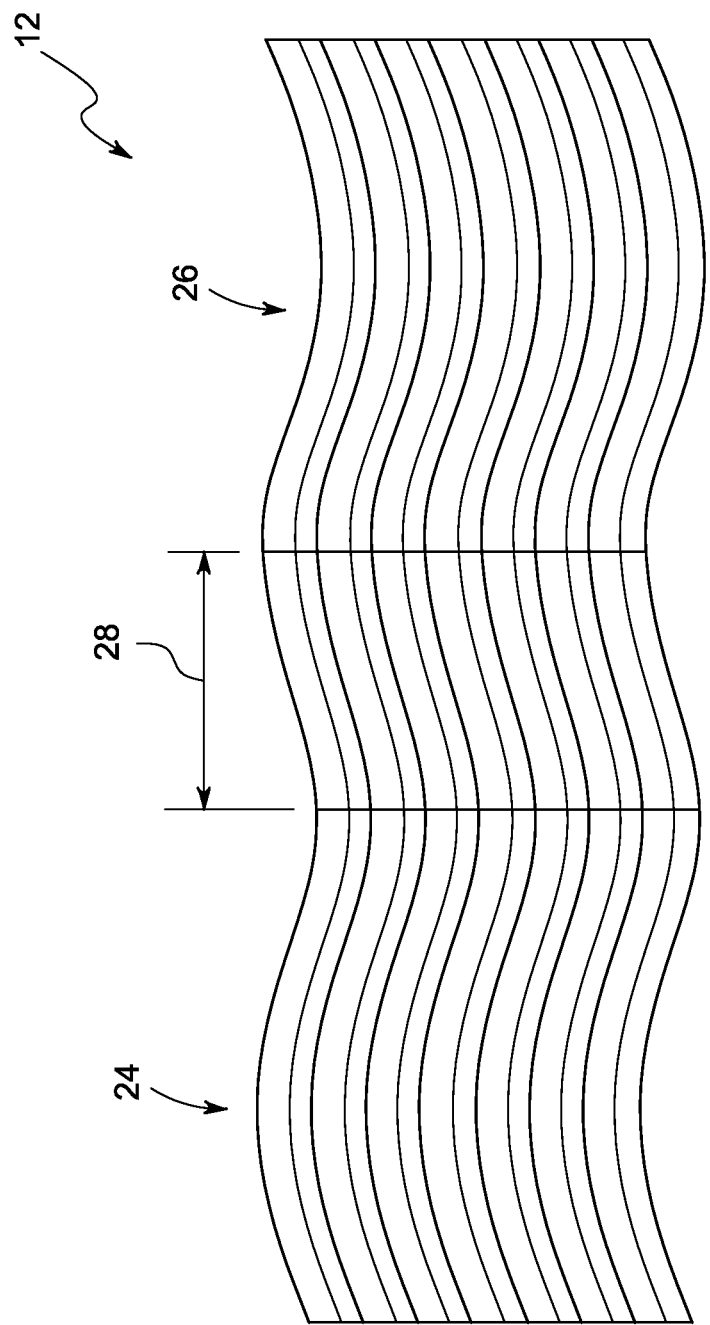

Up to now, the riblets (i.e. peaks 18 and valleys 20) of the microstructure 12 were substantially linear along the chord length, L, of the microstructure. However, it will be appreciated that the invention is not limited by linear riblets, and that the invention can be practiced with non-linear riblets, as shown in FIGS. 13-15. In this alternative embodiment, the riblets of the microstructure 12 are generally sinusoidal in shape (or S-shaped) along the length, L, of the microstructure 12, as well as having a variable height, H.

In yet another alternative embodiment, the microstructure 12 can have riblets that exhibit a smooth transition between the first region 24 with the first profile and the second region 26 with the second profile, as shown in FIGS. 16 and 17. As shown in FIG. 16, the microstructure 12 transitions smoothly from having four peaks 18 and valleys 20 to two peaks and valleys 20 (i.e. a 4:2 transition). It will be appreciated that the particular non-linear shape of the riblets does not limit the invention, and that the invention can be practiced with other non-linear shapes, such as C-shape, and the like.

The multiple profiles of the microstructure 12 of the invention allows the optimization of noise reduction as a function of the turbulent boundary flow across the fluid dynamic structure 10.

The principles of the invention can be used in many different types of applications. For example, a polymeric textured film with microstructures can be applied to aft sections of wind turbine components, such as blades, airfoils, and the like. In another example, a coating with microstructures can be applied to aft sections, clearance regions, or end wall regions of aircraft engine components, such as fan blades, compressor blades, and the like. In yet another example, a coating with micro-scale structures can be applied to aft sections, clearance regions, or end wall regions of gas turbine components, such as fan blades, compressor blades, and the like. In another example, a coating with micro-scale structures can be applied to stationary components, such as nacelles of aircraft engine, a diffuser of a gas turbine, and the like. In addition, a coating with micro-scale structures can be applied to non-stationary components, such as rotating shafts, and the like.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A fluid dynamic structure comprising:
a surface; and
a microstructure defined by a plurality of peaks and valleys on at least a portion of said surface, the microstructure including a transition region in which each peak and valley changes from a first profile defined by a first spacing and a first height to a second profile defined by a second spacing and a second height at a predetermined distance along a chord length of said fluid dynamic structure while maintaining a very small riblet angle relative to a direction of air flow over the fluid dynamic structure, the second profile being different than the first profile,
wherein the microstructure reduces noise generated by turbulent airflow across the fluid dynamic structure, and
wherein the peaks and valleys extend along a chord length of the fluid dynamic structure and parallel to the direction of air flow over the fluid dynamic structure.

2. The structure according to claim 1, wherein the first spacing and the first height is smaller than the second spacing and the second height.

3. The structure according to claim 1, wherein the predetermined distance is defined by the turbulent airflow across the fluid dynamic structure.

4. The structure according to claim 1, wherein the second spacing and the second height is a rational number multiple of the first spacing and the first height.

5. The structure according to claim 1, wherein the transition region extends along an entire length of the microstructure such that the microstructure is continuously changing from the first profile to the second profile along the entire length of the microstructure.

6. The structure according to claim 1, wherein the spacing and height of the peaks and valleys vary non-linearly along the chord length of the structure, while keeping the spacing to height ratio optimal so as to suppress turbulent eddy growth.

7. The structure according to claim 1, wherein the peaks and valleys have a smooth transition from the first profile to the second profile.

8. The structure according to claim 1, wherein one of the peaks and valley further includes a micro-scale surface texture to allow said surface of the microstructure to be superhydrophobic.

9. A fluid dynamic structure comprising:
a surface; and
a microstructure defined by a plurality of riblets on at least a portion of said surface, the plurality of riblets including a first profile in which each riblet has a first width and a first height at a first location along a chord length of said fluid dynamic structure, and a second profile in which each riblet has a second width and a second height at a second location at a predetermined distance along the chord length of said dynamic fluid structure while maintaining a very small riblet angle relative to a direction of air flow over the fluid dynamic structure, wherein the second profile is different than the first profile, and wherein the second location is different than the first location, and wherein the microstructure reduces noise generated by turbulent airflow across the fluid dynamic structure, and wherein the riblets extend along a chord length of the fluid dynamic structure and parallel to a direction of air flow over the fluid dynamic structure.

10. The structure according to claim 9, wherein the first width and the first height is smaller than the second width and the second height.

11. The structure according to claim 9, wherein the predetermined distance is defined by the turbulent airflow across the fluid dynamic structure.

12. The structure according to claim 9, wherein the second width and the second height is a rational number multiple of the first width and the first height.

13. The structure according to claim 9, wherein a transition region extends along an entire length of the microstructure such that the microstructure is continuously changing from the first profile to the second profile along the entire length of the microstructure.

14. The structure according to claim 9, wherein the width and height of the plurality of riblets vary non-linearly along the chord length of the structure, while keeping the spacing to height ratio optimal so as to suppress turbulent eddy growth.

15. The structure according to claim 9, wherein the plurality of riblets have a smooth transition from the first profile to the second profile.

16. The structure according to claim 9, wherein one of the plurality of riblets further includes a micro-scale surface texture to allow said surface of the microstructure to be superhydrophobic.

* * * * *